(12) United States Patent
Lee et al.

(10) Patent No.: US 7,995,924 B2
(45) Date of Patent: *Aug. 9, 2011

(54) METHOD AND SYSTEM FOR GENERATING SWITCHING CONTROL SIGNAL SEPARATING TRANSMISSION SIGNAL IN OPTICAL REPEATER EMPLOYING TDD SCHEME

(75) Inventors: Jae-Hoon Lee, Seoul (KR); Seong-Taek Hwang, Pyeongtaek-si (KR); Byung-Jik Kim, Seongnam-si (KR); Sang-Ho Kim, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 876 days.

This patent is subject to a terminal disclaimer.

(21) Appl. No.: 12/001,632

(22) Filed: Dec. 12, 2007

(65) Prior Publication Data

US 2008/0145057 A1 Jun. 19, 2008

(30) Foreign Application Priority Data

Dec. 14, 2006 (KR) .................. 10-2006-0127698

(51) Int. Cl.
*H04B 10/22* (2006.01)
*H04J 14/08* (2006.01)

(52) U.S. Cl. ........................ 398/102; 398/115

(58) Field of Classification Search .......... 398/115–117, 398/98–102
See application file for complete search history.

(56) References Cited

U.S. PATENT DOCUMENTS

| 7,826,430 B2* | 11/2010 | Lee et al. ............ 370/337 |
| 2008/0240719 A1* | 10/2008 | Kim et al. ............ 398/96 |

FOREIGN PATENT DOCUMENTS

| KR | 2005-107044 | 11/2005 |
| KR | 2006-10963 | 2/2006 |
| KR | 2006-38685 | 5/2006 |
| KR | 2006-39796 | 5/2006 |

* cited by examiner

*Primary Examiner* — Leslie Pascal
(74) *Attorney, Agent, or Firm* — Cha & Reiter, LLC

(57) ABSTRACT

Disclosed are a method and a system for generating switching control signal separating transmission signal on an access point and a mobile communication terminal in an optical repeater employing, for example, a TDD scheme. The method includes the steps of generating a control signal for generating a switching control signal in transmitting data from the AP and transmitting the control information to a remote during an idle time interval, detecting synchronization information on the downlink signal and time-delay information from the control information, delaying a time interval between the synchronization information and a starting point of the downlink signal, generating the switching control signal for the downlink signal according to the transmission time information of the downlink signal, and performing a switching operation according to the switching control signal and setting a downlink path.

16 Claims, 7 Drawing Sheets

METHOD AND SYSTEM FOR GENERATING SWITCHING CONTROL SIGNAL SEPARATING TRANSMISSION SIGNAL IN OPTICAL REPEATER EMPLOYING TDD SCHEME

CLAIM OF PRIORITY

This application claims the benefit under 35 U.S.C. §119(a) of an application entitled "Method and System for Generating Switching Control Signal Separating Transmission Signal in Optical Repeater Employing TDD Scheme," filed in the Korean Intellectual Property Office on Dec. 14, 2006 and assigned Serial No. 2006-0127698, the contents of which are hereby incorporated by reference.

BACKGROUND OF THE INVENTION

1. Field of the Invention

The present invention relates to a method and a system for generating switching control signal separating a transmission signal in an optical repeater employing a Time Division Duplex (TDD) scheme.

2. Description of the Related Art

Various wireless communication services using a wireless network have been created resulting from the rapid development in computers, electronics, and communication technology. The most common wireless communication service is a wireless voice call service for providing a user of a mobile communication terminal with the voice call wirelessly, which can provide the service anywhere at anytime. Further, the service completes the voice call service by providing a text message service. Recently, a wireless internet service has been on the rise which provides the user of the mobile communication terminal with an internet communication service through a wireless communication network.

The International Mobile Telecommunication 2000 (IMT-2000) of the third generation (3G) mobile communication system has been adopted as a standard by an International Telecommunication Union Recommendations (ITU-R), such as a Code Division Multiple Access (CDMA) system, an EV-DO, a Wideband CDMA (WCDMA) system. The IMT-2000 is the mobile communication system developed aiming at (1) implementing a worldwide direct roaming service including the personal and service mobility, (2) having speech quality equal to that of a wire telephone, (3) having various application services by combining high speed packet data services and a wire/wireless network, which enables to improve the existing quality of speech and a Wireless Application Protocol (WAP) service and (4) providing various multimedia services such as Audio On Demand (AOD), Video On Demand (VOD) or the like with a faster speed as well.

However, there is a limit in providing a very high-speed wireless internet in the existing mobile communication system because (1) the cost for constructing a base station is high, (2) the service charges of the wireless internet are expensive, and (3) usable content is limited due to a small size of a display unit of the mobile communication terminal or the like. Also a Wireless local Area Network (WLAN) scheme is limited in providing public services due to problems of wave interference and a narrow coverage area or the like. Therefore, a Wireless Broadband Internet (WiBro) of the very high-speed portable internet service and the fourth generation (4G) wireless mobile communication which can guarantee the portability and mobility and use the very high-speed wireless internet service at a lower cost has emerged.

The WiBro and the 4G wireless mobile communication employ a portable internet technology of a Time Division Duplex (TDD) scheme included in duplex schemes rather than in the CDMA and WCDMA. Also, an Orthogonal Frequency Division Multiplexing (OFDM) scheme is used for a modulation system.

Here, the TDD scheme is based on a bidirectional transmission scheme that an uplink and a downlink is divided on a time basis by turns in an identical frequency bandwidth. The TDD scheme has a higher transmission efficiency than a Frequency Division Duplex (FDD) scheme for allocating two different frequencies at an uplink and a downlink at different frequencies. The TDD scheme is suitable for transmitting asymmetric or bursting applications due to a dynamic allocation of a time slot. The OFDMA/TDMA schemes are a multiple access scheme similar to the TDMA scheme which allocates all sub-carriers spread over entire bandwidths to a user for a given time and to another user for the rest of the time. The OFDMA/TDMA schemes improve transmission speed per a bandwidth and prevent multipath interference.

The general mobile communication system, a mobile communication service region is divided into a plurality of cells using a frequency reuse concept or the like in order to expand the coverage of the mobile communication network. A wireless base station is constructed around centers of the respective cells in order to process the mobile communication service. Here, a radius of the cell is determined according to the strength of the signal of a corresponding region or an amount of data traffic. That is, the radius of the cell is set to be small in the city having lots of the data traffic amount and large in the city having relatively less amount of the data traffic. In doing so it makes the traffic generated from the respective cells not exceed the processing quantity of the wireless base station in charge of the corresponding mobile communication service.

There have been many efforts to provide better mobile communication service by appropriately adjusting the radius of the cell according to the frequency reuse concept, the amount of the traffic or the like. Nevertheless an electric wave shadow region where it is generally difficult to arrive the electric wave such as an underground, an inside of a building, a tunnel or the like still exists. To construct the plurality of new wireless base stations to solve the frequency shadow in the frequency shadow region causes the economical efficiency to be greatly decreased due to costs for facilities, construction, maintenance and repair or the like. Also it may bring an undesirable results in designing the cell. As a solution, the mobile communication service can be provided using an optical repeater system in the frequency shadow region. The optical repeater system makes a traffic channel allocated to a mother base station to be transmitted through an optical transmission scheme using the optical repeater to the electric wave shadow region thereby solving a problem of the electric wave shadow.

In particular, the 3G mobile communication system and the WiBro system use a higher frequency than the second generation (2G) mobile communication system and propagation path loss is large, diffraction effect is small and penetration loss of a building is large. Therefore, it is desirable to use the optical repeater having a small radius of the cell.

Further, a downlink signal and an uplink signal should be discriminated in order to relay a wireless signal between the base station and a terminal in the optical repeater. The FDD scheme used in the optical repeater of the mobile communication system discriminates the downlink signal and the uplink signal using the duplex. In contrast, the TDD scheme uses an identical frequency to transmit the downlink signal and the uplink signal and discriminates the downlink signal and the uplink signal by dividing time into a section so that it can not discriminate the downlink signal and the uplink signal by using the duplex. Therefore, the optical repeater using the TDD scheme can discriminate the downlink signal and the uplink signal by using a switch and selectively provide a path for the respective signal. To this end, a control signal is necessary so as to correctly identify a starting point of the downlink signal and a starting point of the uplink signal. In effect, switch on/off in response to the respective signals and change a movement path of the signal The optical repeater can receive the control signal from the base station through an optical cable.

The optical repeater employing the TDD scheme should analyze the transmission signal frame and generate switching control signal to control the switch to occur a switching operation between a downlink signal section and the uplink signal section. Meanwhile, the optical repeater transmits the signal through the optical communication cable so a time delay may occur during the transmission. If the switching control signal is not compensated for the time delay of the optical communication cable, an incorrect switching control signal may be generated. If the switching control signal is incorrect it is impossible to correctly discriminate between the downlink signal and the uplink signal.

A solution for the above problem is disclosed in the Korean First Patent Application No. 2006-0010963 entitled "Method and System for Generating Switching Timing Signal for Separating Transmitting and Receiving Signal in Optical Repeater of Mobile Telecommunication Network Using TDD and ODFM Modulation".

FIG. 1 is a diagram illustrating an internal construction of a conventional TDD optical repeater.

FIG. 2 illustrates a structure of the uplink and downlink signal when data are transmitted in the conventional TDD optical repeater.

As shown in FIGS. 1 and 2, a main donor module 200 is connected to a base station 110 through an RF cable. If the main donor module 200 receives the RF signal from the base station 110, it converts the RF signal into an optical signal through an electrical-optical conversion. Then, it transmits the optical signal to a remote module 250 through an optical communication cable and converts the optical signal received from the remote module 250 into the RF signal through an optical-electrical conversion. The converted RF signal is transmitted to the base station 110 through the RF cable.

Further, if the remote module 250 receives the optical signal from the main donor module 200, it converts the received optical signal into the RF signal through the optical-electrical conversion. Then, the converted RF signal is transmitted to a terminal through an antenna, which converts the RF signal received from the terminal into the optical signal through the electrical-optical conversion. The converted optical signal is transmitted to the main donor module 200 through the optical communication cable.

A switching control signal generating circuit 290 detects a part of the RF signal from a coupler 265 and discriminates between a downlink signal and an uplink signal. A switching timing signal is generated capable of controlling a switch and transmits the switching timing signal to the switch 275. In order to generate the switching timing signal, the downlink signal transmitted from the main donor of the base station is transmitted included in control information. Then the switching timing signal for separating the uplink and downlink signal in a remote is generated.

When the downlink signal is input to the switch 275 by the received switching timing signal, the switch 275 radiates the downlink signal to the terminal through the antenna. When the uplink signal is input to the switch 275, the switch 275 interrupts a path connecting to a High Power Amplifier (HPA) 270 and sets the path for inputting the uplink signal to a Low Noise Amplifier (LNA) 280. That is, the terminal (MS) receives the signal directly received from the base station and the signal received passing through the donor 100 and the remote 300 as a multi-path signal. If the difference in the time delay between two signals exceeds a cyclic prefix time of an OFDMA symbol, an inter-symbol interference occurs between the two signals and the rate of data error is increased when the OFDMA symbol is demodulated. Also, it is difficult to adjust a time synchronization of a wireless signal transmitted/received in the base station and the remote 300 as well.

SUMMARY OF THE INVENTION

Accordingly, the present invention has been made to solve the above-mentioned problems occurring in the prior art. The present invention provides a system and a method for generating switching control signal separating transmission signal in optical repeater employing, for example, a TDD scheme, which can generate a correct switching control signal by transmitting timing related information to a remote during an idle time interval rather than a time interval for transmitting a downlink signal in a main donor of a wireless communication system, and can also smoothly manage a ratio between a variably changing downlink and an uplink.

In accordance with an aspect of the present invention, there is provided a method for generating a switching control signal separating a transmission signal of an AP and a mobile communication terminal in an optical repeater, the method including the steps of: generating a control signal for generating a switching control signal in transmitting data from the AP and transmitting the control information to a remote during an idle time interval; detecting synchronization information on the downlink signal and time-delay information from the control information; delaying a time interval between the synchronization information and a starting point of the downlink signal; generating the switching control signal for the downlink signal according to the transmission time information of the downlink signal; and performing a switching operation according to the switching control signal and setting a downlink path.

In accordance with another aspect of the present invention, there is provided a method further including the steps of: analyzing the control information transmitted from a main donor during transmitting data from the terminal; detecting the synchronization information on an uplink signal in the control information; delaying a time as much as a time interval including the time delay information indicating the time difference between the Sync information and a starting point of the downlink signal, transmission time information of the DL signal, and the time interval between the downlink signal and the uplink signal transmitted following the downlink signal; generating the switching control signal in order to set the path for the uplink signal according to the transmission time information of the uplink signal; and performing the switching operation according to the switching control signal and setting the uplink path and outputting the uplink signal.

BRIEF DESCRIPTION OF THE DRAWINGS

The above present invention will be more apparent from the following detailed description taken in conjunction with the accompanying drawings, in which.

DETAILED DESCRIPTION OF THE INVENTION

Figure 1:
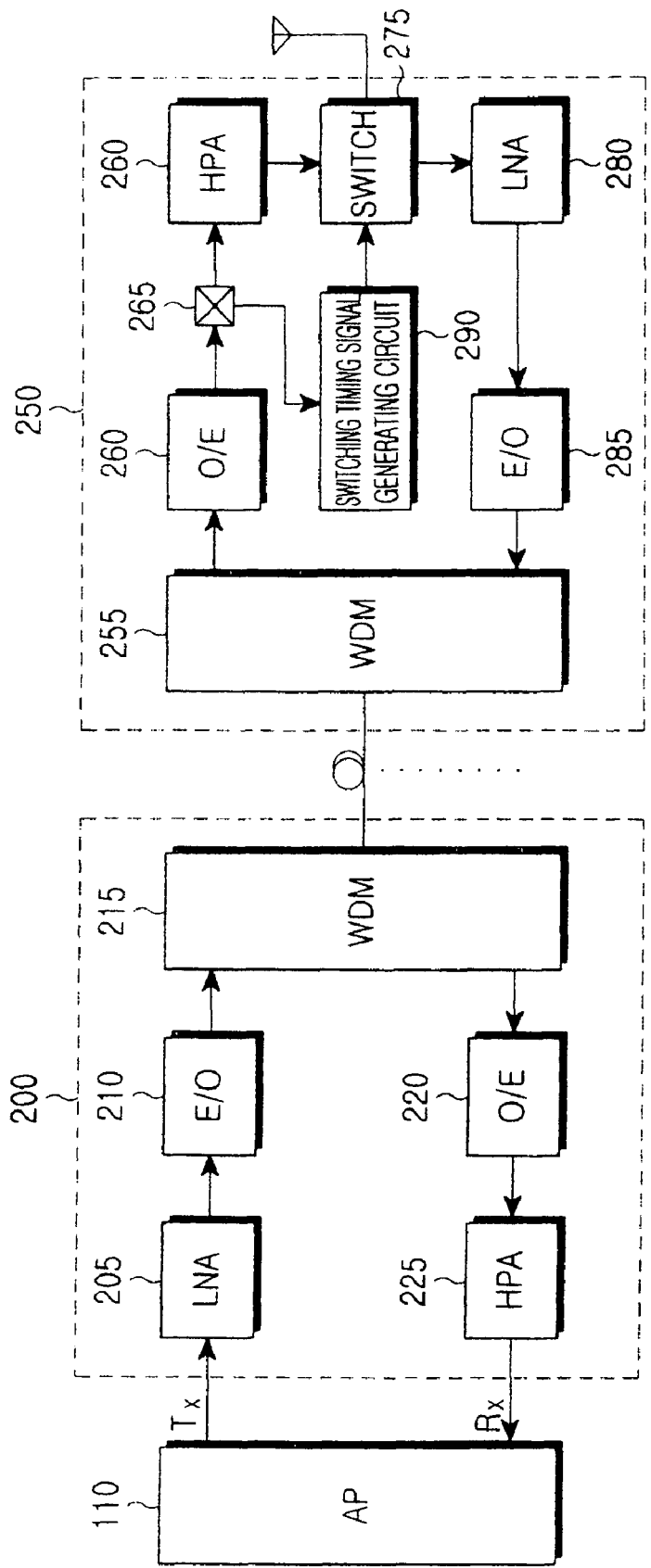
FIG. 1 is a diagram illustrating an internal construction of a conventional TDD optical repeater.
Figure 2:
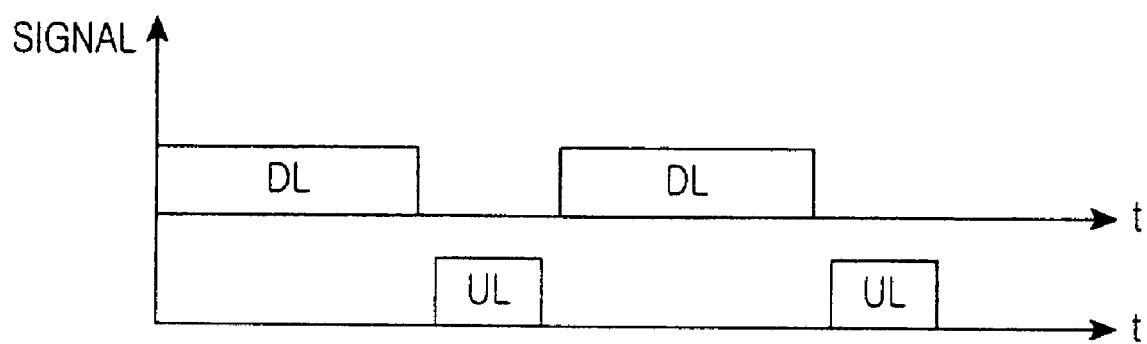
FIG. 2 illustrates a structure of an uplink signal and downlink signal when data are transmitted in the conventional TDD optical repeater.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 3:
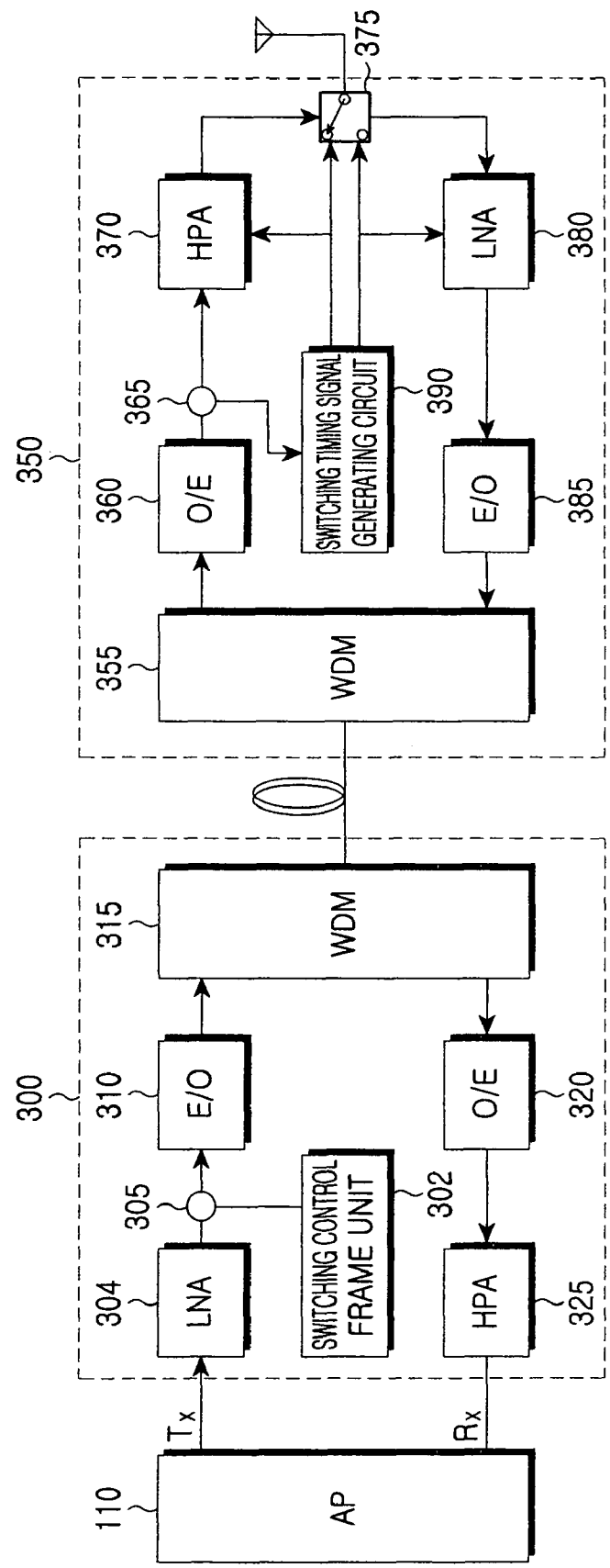
FIG. 3 is a diagram illustrating an internal construction of a TDD optical repeater according to an exemplary embodiment of the present invention.
Figure 4:
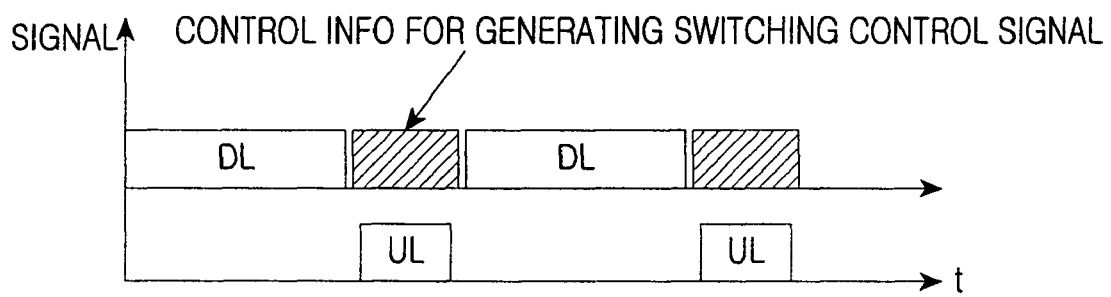
FIG. 4 illustrates a structure of an uplink signal and downlink signal in the TDD optical repeater according to an exemplary embodiment of the present invention.

FIG. 3 is a diagram illustrating an internal construction of a TDD optical repeater according to an exemplary embodiment of the present invention. FIG. 4 illustrates a structure of an uplink signal and downlink signal in the TDD optical repeater according to an exemplary embodiment of the present invention.

As shown in FIG. 3, the TDD optical repeater according to an exemplary embodiment of the present invention includes a main donor 300 and at least one remote 350.

A main donor 300 of the TDD optical repeater is connected to an Access Point (AP) 110 through a transmission line. If the main donor 300 of the TDD optical repeater receives the downlink signal from the AP 110, it converts the downlink signal into an optical signal through an electrical-optical conversion. Then transmits the optical signal to the remote 350 through an optical line, converts the optical signal received from the remote 350 into the uplink signal through an optical-electrical conversion. The converted uplink signal is then transmitted to the AP 110 through the transmission line.

If the remote 350 of the TDD optical repeater receives the optical signal from the main donor 300, it converts the optical signal into the uplink signal through the optical-electrical conversion, then transmits the converted uplink signal to a mobile communication terminal 100 through an antenna, converts the uplink signal received from the mobile communication terminal 100 into the optical signal through the electrical-optical conversion. The converted optical signal is then transmitted to the main donor 300 through the optical communication cable.

The main donor 300 includes internal components such as a switching control frame unit 302, a Low Noise Amplifier (LNA) 304, a signal combiner 305, an Electrical-Optical conversion module (E/O) 310, a Wavelength Division Multiplexer (WDM) 315, an Optical-Electrical conversion module (O/E) 320, a High Power Amplifier (HPA) 325 or the like. The remote 350 includes internal components such as a WDM 355, an O/E 360, a signal separator 365, an HPA 370, a switch 375, an LNA 380, an E/O 385, a switching timing signal generator 390 or the like. The main donor 300 of the TDD optical repeater is connected to a plurality of the remotes 350 through the optical line so that a coverage of the optical repeater can be expanded.

The operation of transmitting the downlink signal and the uplink signal by using the aforementioned components of the TDD optical repeater will be described in detail hereinbelow.

The main donor 300 transmits the downlink signal received from the AP 110 to the LNA 304. The LNA 304 reduces noise components of the downlink signal and amplifies the signal components. The LNA 304 then transmits them to the signal combiner 310.

The switching control frame unit 302 generates a control frame including synchronization (Sync) information, time-delay information ($\Delta t$), transmission time information ($t_{DL}$) of the downlink signal, transmission time information ($t_{UL}$) of the uplink signal, Tx/Rx Transition Gap (TTG) information ($t_{TTG}$), Rx/Tx Transition Gap (RTG) information ($t_{RTG}$) or the like.

As shown in FIG. 4 The downlink signal is transmitted from the AP 110 and then the switching control frame unit 302 transmits the control frame to the remote 350 during the transmission of the uplink signal, i.e., an idle time interval of the downlink signal. Here, the control frame is transmitted as a digital signal unlike the downlink signal.

The signal combiner 305 combines the downlink signal amplified in the LNA 304 with the control frame generated in switching control frame unit 302 and transmits it to the E/O 310. The E/O 310 converts the downlink signal into the optical signal through the electrical-optical conversion and transmits the converted optical signal to the WDM 315. The WDM 315 transmits a plurality of the optical signal received from the E/O 310 to the remote 350 through the optical line.

The WDM 315 or 355 is a device which divides an optical fiber channel into a plurality of channels by a wavelength of light so that it enables the channels to be used for a plurality of communication lines. When the WDM 315 or 355 transmits the optical signal, it can be operated as a wavelength division multiplexer for transmitting the signal having several optical wavelength on one optical fiber. When the WDM 315 or 355 receives the optical signal, it can be operated as a wavelength division demultiplexer for dividing the signal having several optical wavelength on one optical fiber respectively. The E/O 310 or 385 can be employed by using a laser diode, and the O/E 320 and 360 can be employed by using a photo diode.

The WDM 355 of the remote 350 divides the received plural optical signals and transmits them to the O/E 360. The O/E 360 converts the optical signal into the downlink signal through the optical-electrical conversion and transmits the converted signal to the signal separator 365.

The signal separator 365 separates the downlink signal transmitted from the O/E 360 and the control frame. The separated control frame is transmitted to the switching timing signal generator 390. and the signal separator 365 also transmits the separated downlink signal to the HPA 370.

When the downlink signal and the control frame transmitted from the switching control frame unit 302 are separated in the signal separator 365. The switching timing signal generator 390 discriminates the downlink (DL) signal and the uplink (UL) signal and analyzes the control frame and generates the switching control signal according to corresponding information.

The HPA 370 amplifies the DL signal up to an effective power for wirelessly transmitting and supplies the signal to the switch 375. The switch 375 radiates the DL signal to the mobile communication terminal through the antenna.

The switch 375 discriminates the UL signal and the DL signal based on the switching control signal generated in the switching timing signal generator 390. The switching operation is performed (switch-on and switch-off) and selectively sets the path for the respective signals.

If the remote 350 receives the UL signal from the mobile communication terminal through the antenna, it removes a noise through the LNA 380, amplifies the signal components and transmits the UL signal to the E/O 385. The E/O 385 converts the UL signal into the optical signal through the electrical-optical conversion and transmits the converted optical signal to the WDM 355. The WDM 355 transmits the optical signal received from the E/O 385 to the main donor 300 through the optical line.

The WDM 315 of the main donor 300 divides the received plurality of the optical signal and transmits them to the O/E 320. The O/E 320 converts the optical into the UL signal through the optical-electrical conversion and transmits the converted signal to the HPA 325.

The HPA 325 amplifies the UL signal up to an effective power for transmitting to the AP 110 and transmits the signal to the AP 110 through the transmission line.

Figure 5:
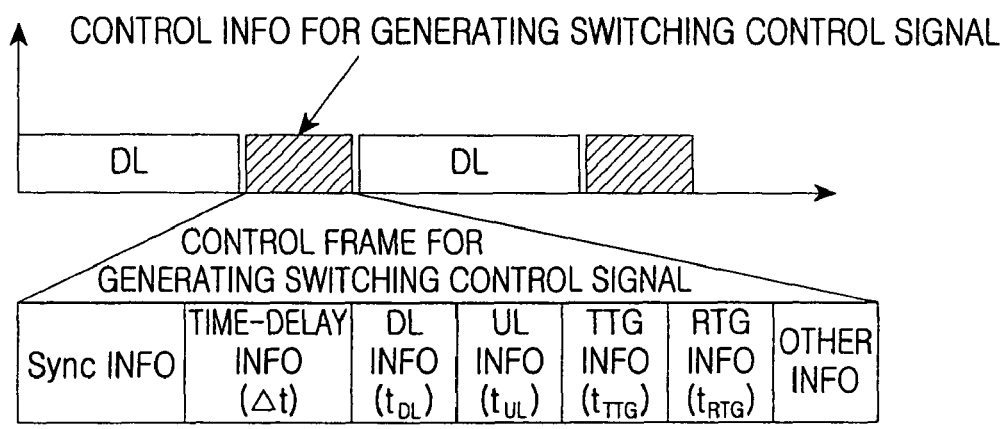
FIG. 5 is a diagram illustrating a control frame for generating a switching control signal in the TDD optical repeater according to an exemplary embodiment of the present invention.

FIG. 5 is a diagram illustrating a structure of the control frame for generating the switching control signal in the TDD optical repeater according to an exemplary embodiment of the present invention.

As shown in FIG. 5, the control frame generated in the switching control frame unit 302 includes synchronization (Sync) information capable of synchronizing the UL/DL signal so as to generate the switching control signal in the remote 350, time-delay information ($\Delta t$) indicating a time difference between the starting points of the DL signal and the Sync Information, transmission time information ($t_{DL}$) of the DL signal, transmission time information ($t_{UL}$) of the UL signal, Tx/Rx Transition Gap (TTG) information ($t_{TTG}$), Rx/Tx Transition Gap (RTG) information ($t_{RTG}$) or the like. Further, the control frame can include other information for controlling.

Here, the TTG information and the RTG information is a guard time for discriminating the transmission time of the DL signal and the UL signal. During this time interval, it is not allowed to transmit an effective signal including data at the base station and the mobile communication terminal. The TTG information defines the time interval ($t_{TTG}$) between the DL signal and the UL signal transmitted following the DL signal. The base station is changed into a mode for receiving the UL signal and the mobile communication terminal is changed into a mode for transmitting the UL signal during the time interval.

The RTG information defines the time interval ($t_{RTG}$) between the UL signal and the DL signal transmitted following the UL signal. During the time interval, the base station is changed into a mode for transmitting the DL signal and the mobile communication terminal is changed into a mode for receiving the UL signal.

The control frame for generating the switching control signal includes every time information necessary for the TDD scheme. The switching timing signal generator 365 can generate not only the control signal (on, off) of the switch 375 and the HPA 370 but also the control signal (on, off) of the LNA 380 by using the information.

Figure 6A:
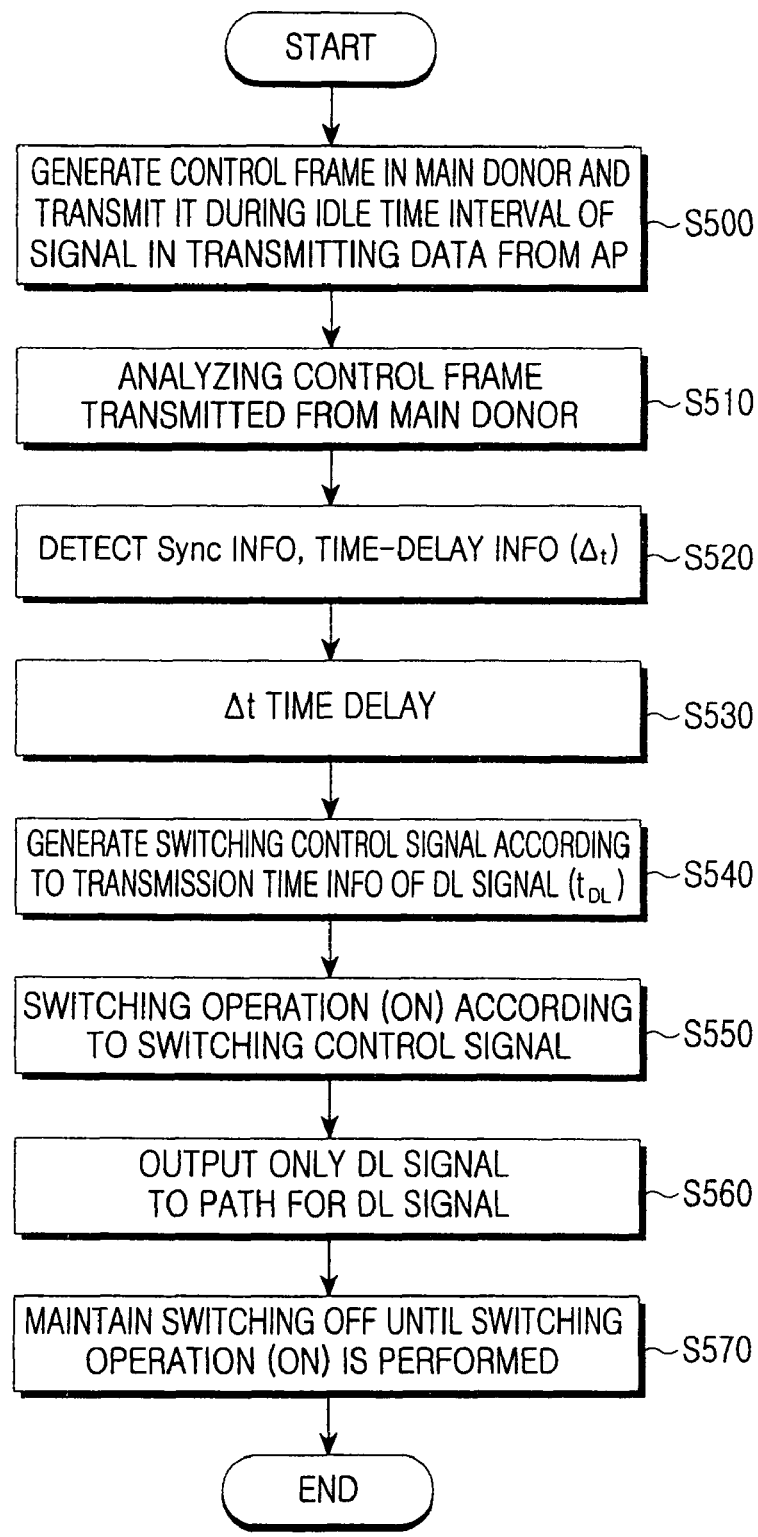
FIGS. 6A and 6B are flowcharts illustrating a method of generating the switching control signal in the TDD optical repeater according to an exemplary embodiment of the present invention.
Figure 6B:
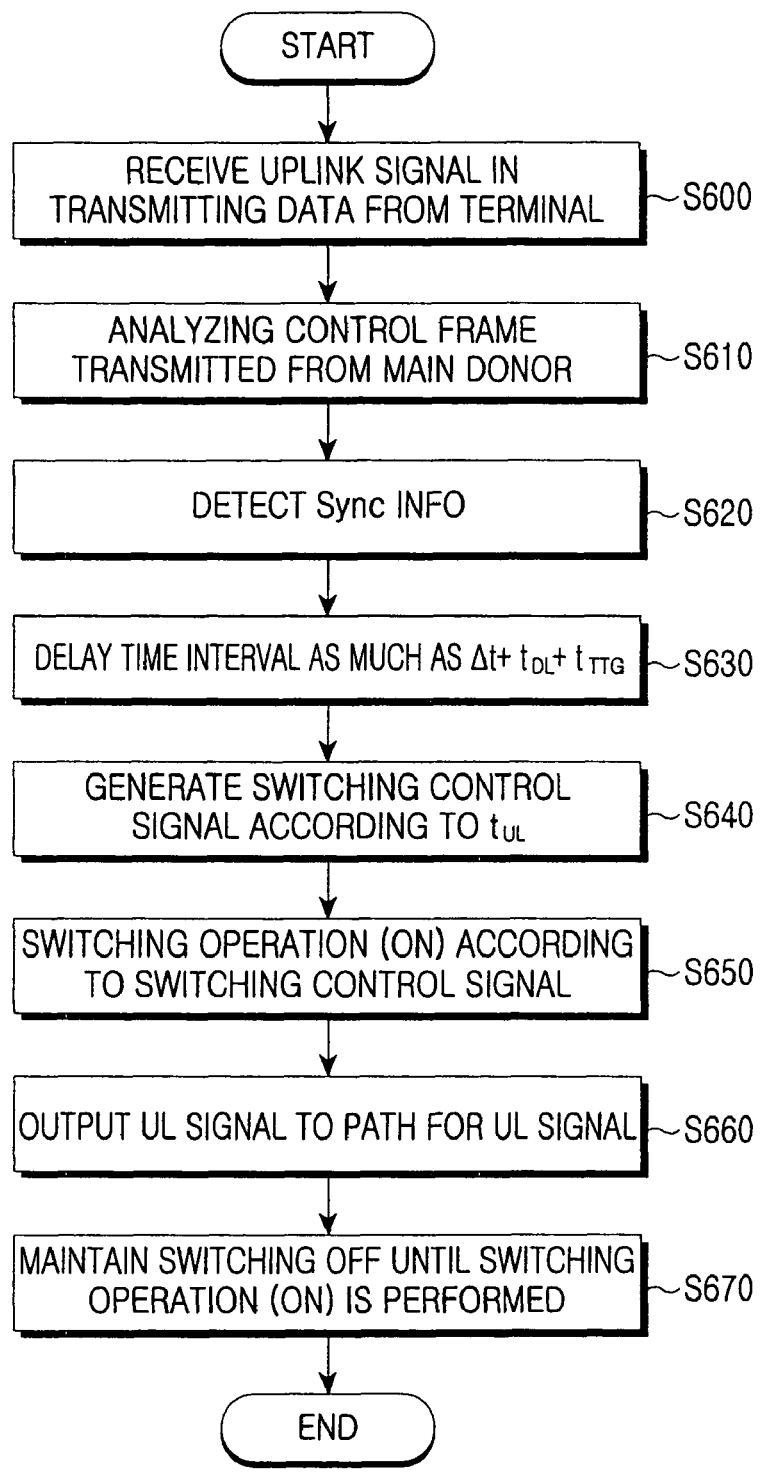
Figure 7:
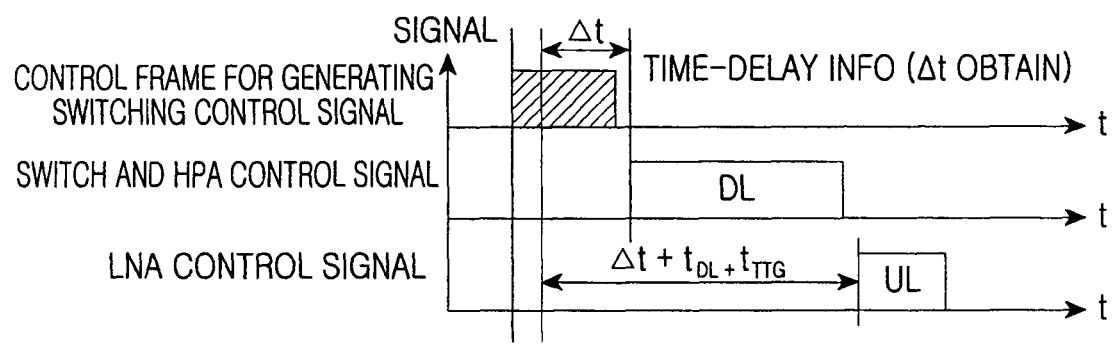
FIG. 7 illustrates an example of an operation of a switching control signal in the TDD optical repeater according to an exemplary embodiment of the present invention.

FIGS. 6A and 6B are flowcharts illustrating a method of generating the switching control signal in the TDD optical repeater according to an exemplary embodiment of the present invention. FIG. 7 illustrates an example of a switching control signal operation in the TDD optical repeater according to an exemplary embodiment of the present invention.

As shown in FIG. 6A, in case of the downlink direction, while the DL signal is transmitted from the AP 110 and then the UL signal is transmitted, i.e., the idle time interval of the DL signal, the main donor 300 generates the control frame for generating the switching control signal and transmits it to the remote 350 (S500).

The switching timing signal generator 365 of the remote 350 analyzes the control frame transmitted from the main donor 300 and detects the Sync information on the DL signal and the time delay information ($\Delta t$) sequentially so as to generate the switching control signal (S520).

Next, as shown in FIG. 7, the switching timing signal generator 365 delays the time as much as the time difference ($\Delta t$) between the Sync information and the starting point of the DL signal (S530). The $\Delta t$ includes the time difference information between the control frame for generating the switching control signal and the DL signal.

The switching timing signal generator 365 generates the switching control signal in order to set the DL path in the switch according to the transmission time information ($t_{UL}$) of the DL signal (S540) and transmits the switching control signal.

Further, the switch 375 performs the switching operation (switch-on) according to the switching control signal (S550) and sets the DL path. The switch 375 transmits only the DL signal after removing the control frame for generating the switching control signal among the data transmitted as the DL signal through the antenna (S560).

After switching on according to the switching control signal, the DL signal is not transmitted from the main donor 300. Therefore, the switching operation is not performed (switch-off) according to the switching control signal so the current state of switching off is maintained until the switching operation is performed (switch-on) (S570).

As shown in FIG. 6B, in the case of the uplink direction, if the remote 350 receives the UL signal from the mobile communication terminal through the antenna (S600), the switching timing signal generator 365 analyzes the control frame transmitted from the main donor 300 (S610) and detects the Sync information on the UL signal (S620).

Next, as shown in FIG. 7, the switching timing signal generator 365 delays the time as much as the time interval including the time delay information ($\Delta t$) indicating the time difference between the Sync information for generating the switching control signal and the starting point of the DL signal, the transmission time information ($t_{DL}$) of the DL signal, and the time interval ($t_{TTG}$) between the DL signal and the UL signal transmitted following the DL signal. That is, the switching timing signal generator 365 delays the time as much as the time interval including $\Delta t + t_{DL} + t_{TTG}$ (S630).

The switching timing signal generator 365 generates the switching control signal, so that the switch 375 sets the UL path based on the transmission time information (t) of the UL signal (S640).

Further, the switch 365 performs the switching operation (switch-on) (S650) according to the switching control signal, and sets the UL path, removes the noise from the UL signal passing through the LNA 380, amplifies the signal components and transmits the UL signal to the main donor 300 (S660).

Meanwhile, after transmitting the UL signal, the UL signal is not transmitted so that the switching operation is not performed (switch-off) according to the switching control signal, therefore, the current state of switching off is maintained until the switching operation is performed (switch-on) (S670).

The present invention can transmit the timing control information during the idle time interval rather than the time interval of transmitting the DL signal in the main donor of the wireless communication system and generates the correct switching control signal according to the control information. It also smoothly manages the ratio between the variably changing downlink and the uplink in such a manner that the optical repeater is securely operated.

The present invention according to the exemplary embodiment is employed with the method and the system for generating the switching control signal separating the transmission signal in the optical repeater employing the TDD scheme.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for generating a switching control signal separating a transmission signal of an Access Point (AP) and a mobile communication terminal in an optical repeater, the method comprising the steps of:
    generating a control signal for generating a switching control signal in transmitting data from the AP and transmitting the control information to a remote during an idle time interval;
    detecting synchronization information on the downlink signal and time-delay information from the control information;
    delaying a time interval between the synchronization information and a starting point of the downlink signal;
    generating the switching control signal for the downlink signal according to the transmission time information of the downlink signal; and
    performing a switching operation according to the switching control signal and setting a downlink path.

2. The method as claimed in claim 1, wherein the method for generating a switching control signal is employed in a Time Division Duplex (TDD) scheme.

3. The method as claimed in claim 1, further including the step of removing the control information the information transmitted to the downlink signal and outputting only downlink signal.

4. The method as claimed in claim 1, where in the time interval is no greater than a time difference.

5. The method as claimed in claim 1, further comprising the steps of:
    analyzing the control information transmitted from a main donor during transmitting data from the terminal;
    detecting the synchronization information on an uplink signal in the control information;
    delaying a time as much as a time interval including the time delay information indicating the time difference between the Sync information and a starting point of the downlink signal, transmission time information of the DL signal, and the time interval between the downlink signal and the uplink signal transmitted following the downlink signal;
    generating the switching control signal in order to set the path for the uplink signal according to the transmission time information of the uplink signal; and
    performing the switching operation according to the switching control signal and setting the uplink path and outputting the uplink signal.

6. The method as claimed in claim 1, further comprising a step of maintaining a current state until the switching operation is performed, without performing the switching operation by the switching control signal.

7. The method as claimed in claim 1, wherein the control information comprises synchronization (Sync) information capable of synchronizing the uplink/downlink signal so as to generate the switching control signal, time-delay information ($\Delta t$) indicating the time difference between the synchronization information and the starting point of the downlink signal, transmission time information ($t_{DL}$) of the downlink signal, transmission time information ($t_{UL}$) of the uplink signal, Tx/Rx Transition Gap (TTG) information ($t_{TTG}$) indicating a time interval between the downlink signal and the uplink signal transmitted following the downlink signal, and Rx/Tx Transition Gap (RTG) information ($t_{RTG}$) indicating a time interval between the uplink signal and the downlink signal transmitted following the uplink signal.

8. A system for generating a switching control signal separating a transmission signal of an AP and a mobile communication terminal in an optical repeater, the system comprising:
    a main donor for generating control information in a switching control frame unit in order to generate a switching control signal during transmitting data from the AP and transmitting the control information to a remote during an idle time interval; and
    a remote to generate the switching control signal according to the control information and set a link path according to the switching control signal to enable output the uplink and downlink signal.

9. The system as claimed in claim 8, where the system is employed in a Time Division Duplex (TDD) scheme.

10. The system as claimed in claim 8, wherein the main donor converts the downlink signal and the control information into an optical signal and transmits the converted optical signal and the converted control information to the remote, and converts the optical signal received from the remote into the uplink signal and transmits the converted uplink signal to the AP.

11. The system as claimed in claim 10, wherein the main donor comprises a Low Noise Amplifier (LNA), a signal combiner, an electrical-optical conversion module, a Wavelength Division Multiplexer (WDM), an optical-electrical conversion module and a High Power Amplifier (HPA).

12. The system as claimed in claim 11, wherein the signal combiner combines the downlink signal transmitted from the LNA with the control information generated from the switching control frame unit.

13. The system as claimed in claim 11, wherein the remote comprises the WDM, the optical-electrical conversion module, a signal separator, the HPA, a switch, the LNA, the electrical-optical conversion module, and a switching timing signal generator.

14. The system as claimed in claim 13, wherein the signal separator separates the control information from the downlink signal converted in the optical-electrical conversion module and transmits the separated control information to the switching timing signal generator.

15. The system as claimed in claim 13, wherein the switching timing signal generator generates the control signal for controlling the switch, the HPA and the LNA.

16. The system as claimed in claim 8, wherein the remote converts the optical signal received from the main donor into the downlink signal and transmits the converted downlink signal to the terminal, and converts the uplink signal received from the terminal into the optical signal and transmits the converted optical signal to the main donor.

* * * * *